(12) United States Patent
Griffin et al.

(10) Patent No.: US 9,488,254 B2
(45) Date of Patent: Nov. 8, 2016

(54) METHOD FOR EMBEDDED FEEDBACK CONTROL FOR BI-STABLE ACTUATORS

(71) Applicant: Raytheon Company, Waltham, MA (US)

(72) Inventors: Eric J. Griffin, Ranchos Palos Verdes, CA (US); Jerry Hershberg, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/091,128

(22) Filed: Nov. 26, 2013

(65) Prior Publication Data

US 2014/0363150 A1    Dec. 11, 2014

Related U.S. Application Data

(60) Provisional application No. 61/833,599, filed on Jun. 11, 2013, provisional application No. 61/833,587, filed on Jun. 11, 2013, provisional application No. 61/833,592, filed on Jun. 11, 2013.

(51) Int. Cl.
*H02P 7/29* (2016.01)
*F16H 21/18* (2006.01)
(Continued)

(52) U.S. Cl.
CPC ............... *F16H 21/18* (2013.01); *F01L 9/04* (2013.01); *G01J 5/06* (2013.01); *G01J 5/0834* (2013.01);
(Continued)

(58) Field of Classification Search
CPC ............ G03B 9/22; G03B 9/08; F16H 21/18
USPC .................................................. 396/449, 454
See application file for complete search history.

(56) References Cited

U.S. PATENT DOCUMENTS 3,082,674 A    3/1963  Bagby
3,699,863 A *  10/1972  Yamamoto .................... 396/411
(Continued)

FOREIGN PATENT DOCUMENTS

EP    2416216 A1    2/2012
GB    2446606 A     8/2008
(Continued)

OTHER PUBLICATIONS

United States Notice of Allowance dated Aug. 4, 2014 in connection with U.S. Appl. No. 14/170,237; 13 pages.
(Continued)

*Primary Examiner* — David Gray
*Assistant Examiner* — Dennis Hancock

(57) ABSTRACT

A drive mechanism having a bi-stable motor driving an actuator with a high starting torque, and a slower, regulated velocity as the actuator moves through its range of travel. This advantageously maintains high torque margins at low velocity, and lowers the kinetic energy of the bi-stable actuator at end of travel by limiting the terminal velocity and establishing a softer stop. A solenoid may be used in one embodiment. Actual bi-stable motor values are obtained immediately before the move to maintain accurate control of the motor, such as the resistance and inductance of the motor coil. For instance, the bi-stable motor may be driven into a stop, and the coil resistance may be calculated by sensing current associated with the calibration voltage. Inductance may be measured similarly by applying low level AC currents. Back-emf is sensed through the coil resistance, and an estimated motor rotation rate is sent to a feedback loop to maintain the desired rate.

20 Claims, 12 Drawing Sheets

(51) Int. Cl.
| | |
|---|---|
| G03B 9/08 | (2006.01) |
| G05B 6/02 | (2006.01) |
| F01L 9/04 | (2006.01) |
| H01F 7/18 | (2006.01) |
| G01J 5/06 | (2006.01) |
| G01J 5/62 | (2006.01) |
| G01J 5/08 | (2006.01) |
| G01R 31/06 | (2006.01) |

(52) U.S. Cl.
CPC . *G01J 5/62* (2013.01); *G03B 9/08* (2013.01); *G05B 6/02* (2013.01); *H01F 7/1844* (2013.01); *G01R 31/06* (2013.01); *H02P 7/2913* (2013.01); *Y10T 74/18248* (2015.01)

(56) References Cited

U.S. PATENT DOCUMENTS

| | | | |
|---|---|---|---|
| 3,938,168 | A | 2/1976 | Lange |
| 4,121,235 | A | 10/1978 | Fujita et al. |
| 4,592,083 | A | 5/1986 | O'Brien |
| 4,995,700 | A | 2/1991 | Barney et al. |
| 5,128,796 | A | 7/1992 | Barney et al. |
| 5,402,202 | A | 3/1995 | Washisu et al. |
| 5,689,746 | A | 11/1997 | Akada et al. |
| 5,775,276 | A | 7/1998 | Yanai et al. |
| 5,991,143 | A | 11/1999 | Wright et al. |
| 6,128,175 | A | 10/2000 | Wright et al. |
| 6,133,569 | A | 10/2000 | Shoda et al. |
| 6,285,151 | B1 | 9/2001 | Wright et al. |
| 6,366,441 | B1 | 4/2002 | Ozawa et al. |
| 6,423,419 | B1 | 7/2002 | Teer et al. |
| 6,515,285 | B1 | 2/2003 | Marshall et al. |
| 6,995,359 | B1 | 2/2006 | Hillenbrand et al. |
| 7,410,310 | B2 | 8/2008 | Kihara |
| 8,164,813 | B1 | 4/2012 | Gat et al. |
| 8,911,163 | B1 | 12/2014 | Yanevich et al. |
| 2002/0030163 | A1 | 3/2002 | Zhang |
| 2004/0238741 | A1 | 12/2004 | Gat et al. |
| 2005/0035870 | A1 | 2/2005 | Bauerle et al. |
| 2006/0255275 | A1 | 11/2006 | Garman et al. |
| 2007/0046143 | A1 | 3/2007 | Blandino et al. |
| 2007/0090782 | A1* | 4/2007 | Endo ............... B62D 5/046 318/432 |
| 2007/0279793 | A1* | 12/2007 | Hansen et al. ............ 360/75 |
| 2007/0280679 | A1 | 12/2007 | Kato et al. |
| 2008/0017816 | A1 | 1/2008 | Willats et al. |
| 2008/0030891 | A1* | 2/2008 | Kim et al. ............ 360/78.06 |
| 2008/0094728 | A1 | 4/2008 | Matsumoto et al. |
| 2008/0304126 | A1 | 12/2008 | Powell et al. |
| 2009/0293654 | A1 | 12/2009 | Pintauro |
| 2010/0053412 | A1* | 3/2010 | Sekimoto et al. ......... 348/335 |
| 2010/0220988 | A1 | 9/2010 | Ohno |
| 2011/0174979 | A1 | 7/2011 | Garman et al. |
| 2011/0206362 | A1 | 8/2011 | Viglione et al. |
| 2011/0211823 | A1* | 9/2011 | Tsai ......................... 396/213 |
| 2011/0234892 | A1 | 9/2011 | Yasuda et al. |
| 2012/0019404 | A1 | 1/2012 | Brosio |
| 2012/0063014 | A1 | 3/2012 | Terahara et al. |
| 2012/0257099 | A1 | 10/2012 | Tsai |
| 2012/0260002 | A1 | 10/2012 | Hildebran et al. |
| 2014/0061467 | A1* | 3/2014 | Buzerak et al. ......... 250/338.1 |

FOREIGN PATENT DOCUMENTS

| | | |
|---|---|---|
| JP | 2001172766 | 6/2001 |
| JP | 2007114672 A | 5/2007 |
| WO | WO 95/33226 | 12/1995 |

OTHER PUBLICATIONS

U.S. Office Action dated Dec. 4, 2014 in connection with U.S. Appl. No. 14/170,348; 19 pages.
International Search Report and Written Opinion dated Oct. 27, 2014 in connection with International Patent Application No. PCT/US2014/042009, 8 pages.
International Search Report and Written Opinion dated Nov. 12, 2014 in connection with International Patent Application No. PCT/US2014/041769, 13 pages.
International Search Report and Written Opinion dated Oct. 29, 2014 in connection with International Patent Application No. PCT/US2014/041966, 8 pages.
International Search Report and Written Opinion dated Oct. 29, 2014 in connection with International Patent Application No. PCT/US2014/041963, 8 pages.
U.S. Office Action dated Mar. 13, 2015 in connection with U.S. Appl. No. 14/088,176; 13 pages.
U.S. Office Action dated May 21, 2015 in connection with U.S. Appl. No. 14/170,276; 24 pages.
U.S. Office Action dated Apr. 20, 2015 in connection with U.S. Appl. No. 13/669,996; 13 pages.
U.S. Office Action dated May 20, 2015 in connection with U.S. Appl. No. 14/071,970; 25 pages.
Yukio Miyakawa, "Friction and Wear Performance of Gold and Gold Alloy Films"; National Aerospace Laboratory, Tokyo Japan; 1980; pp. 21-30.
Charles S. Clark; "Resolution for Fretting Wear Contamination on Cryogenic Mechanism"; 41st Aerospce Mechanisms Symposium, Jet Propulsion Laboratory; May 16-18, 2012; pp. 399-410.
Donald H. Buckley; "Friction, Wear, and Lubrication in Vacuum"; National Aeronautics and Space Administration; 1971; 191 pages.
Donald F. King, et al., "3rd-generation MW/LWIR sensor engine for advanced tactical systems", Infrared Technology and Applications XXXIV, Proc. of SPIE, vol. 6940, 2008, 12 pages.
"Diaphragm (optics)", Wikipedia, Oct. 7, 2012, 4 pages.
"Aperture", Wikipedia, Nov. 4, 2012, 9 pages.
Kazuhisa Miyoshi, et al., "Durability Evaluation of Selected Solid Lubricating Films", May 2001, 12 pages.
M. A. Sherbiney et al., "Friction and Wear of Ion-Plated Soft Metallic Films", Wear, 45 (1977), p. 211-220.
S. Jahanmir, et al., "Sliding Wear Resistance of Metallic Coated Surfaces", Wear, 40 (1976), p. 75-84.
International Search Report and Written Opinion dated Feb. 6, 2014 in connection with International Patent Application No. PCT/US2013/068649.
International Search Report and Written Opinion dated Feb. 5, 2014 in connection with International Patent Application No. PCT/US2013/068678.
International Search Report dated Oct. 27, 2014 in connection with International Patent Application No. PCT/US2014/042010.
U.S. Office Action dated Jun. 10, 2014 in connection with U.S. Appl. No. 13/669,996; 18 pages.
U.S. Office Action dated Nov. 6, 2014 in connection with U.S. Appl. No. 13/669,996; 8 pages.
U.S. Office Action dated Mar. 31, 2014 in connection with U.S. Appl. No. 14/170,348; 10 pages.
U.S. Office Action dated Aug. 20, 2015 in connection with U.S. Appl. No. 13/669,996; 12 pages.
U.S. Office Action dated Sep. 18, 2015 in connection with U.S. Appl. No. 14/170,276; 25 pages.
U.S. Office Action dated Nov. 13, 2015 in connection with U.S. Appl. No. 14/071,970; 19 pages.
U.S. Office Action issued for U.S. Appl. No. 14/071,970 dated Mar. 22, 2016, 14 pgs.

\* cited by examiner

WITH 25% SENSED INCREASE IN RESISTANCE,
10% UNSENSED INCREASE IN INDUCTANCE

WITH 25% SENSED INCREASE IN RESISTANCE,
10% UNSENSED DECREASE IN INDUCTANCE

WITH 1% UNSENSED DECREASE IN RESISTANCE

METHOD FOR EMBEDDED FEEDBACK CONTROL FOR BI-STABLE ACTUATORS

TECHNICAL FIELD

The present disclosure is directed in general to drive mechanisms and actuators, and more specifically to bi-stable actuators utilized in unstable systems, including an actuator having a high terminal velocity and significant kinetic energy at end of travel, including but not limited to such actuators used in IR imaging shutters.

BACKGROUND OF THE DISCLOSURE

Drive mechanisms including actuators are conventionally utilized to control the selective positioning of one or more members of a system. System design requirements dictate, and often limit, the specific design suitable for the application. In some environments, unstable actuators are utilized, such as but not limited to bi-stable actuators.

Rotary solenoid actuators advantageously provide high starting torque, but continually accelerate along the length of travel, resulting in impact at the end of travel. Feedback loops are typically not used with rotary solenoids, so the velocity at the end of travel is typically much higher than needed. Adding position feedback sensors defeats the packaging advantages of using the solenoid.

The problem becomes more pronounced when the actuator is bi-stable, with significant detent forces at the ends of travel holding the actuator into the stops. While this arrangement is highly desirable from a power consumption perspective, it requires higher torque application at the beginning of travel, resulting in high velocities at the end of travel.

Prior applications have tried to limit the impact velocity by limiting the duration that the actuator is powered on. These methods include applying current for only a short duration (timing), and shutting the actuator off after tripping a proximity sensor. These methods work better on statically neutral actuators, where the actuator will coast freely after power is removed. These methods require estimating the amount of time and torque required to meet the travel requirements, particularly when parameters are variable over the operating environment. Furthermore, timing is only partially effective with bi-stable actuators, since the actuator will freely accelerate once it is past the detent position, resulting in high velocity at the end of travel. Furthermore, removing power too soon will result in the actuator not overcoming the detent torque and fail to move to the alternate position as commanded.

What is desired is a means of providing an bi-stable actuator having a high starting torque, but a slower, regulated velocity as the actuator moves through its range of travel, without the added weight and volume of a position feedback transducer.

SUMMARY OF THE DISCLOSURE

To address one or more of the above-deficiencies of the prior art, one embodiment described in this disclosure comprises a drive mechanism having a bi-stable motor driving an actuator with a high starting torque, and a slower, regulated velocity as the actuator moves through its range of travel. This advantageously maintains high torque margins at low velocity, and lowers the kinetic energy of the bi-stable actuator at end of travel by limiting the terminal velocity and establishing a softer stop. A solenoid may be used in one embodiment. Actual bi-stable motor values are obtained immediately before the move to maintain accurate control of the motor, such as the resistance and inductance of the motor coil. For instance, the bi-stable motor may be driven into a stop, and the coil resistance may be calculated by sensing current associated with a calibration voltage. Inductance may be measured similarly by applying low level AC currents. Back-emf is sensed through a sense resistor, and an estimated motor rotation rate is sent to a feedback loop to maintain the desired rate.

In one preferred embodiment, a shutter of an IR imaging device is positioned in response to the actuator, which shutter remains thermally isolated from the motor and arm. Other systems including bi-stable actuators may benefit from the present disclosure. Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
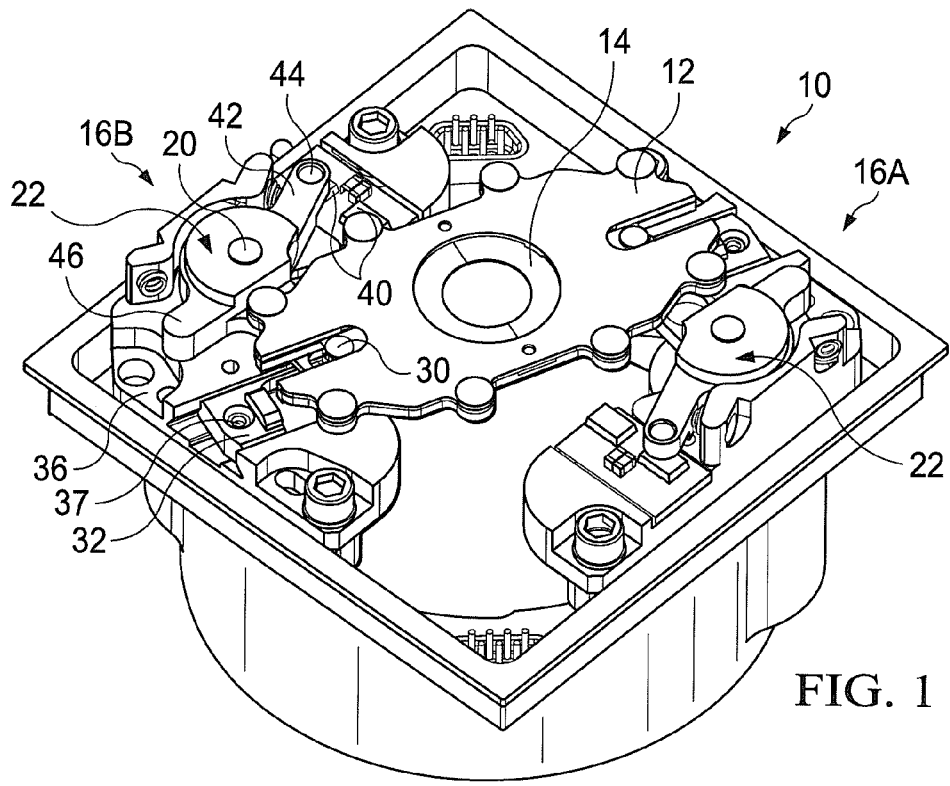
FIG. 1 illustrates a thermal imaging device including a shutter and a thermally isolated drive system configured to position the shutter according to an embodiment of the present disclosure.
Figure 2:
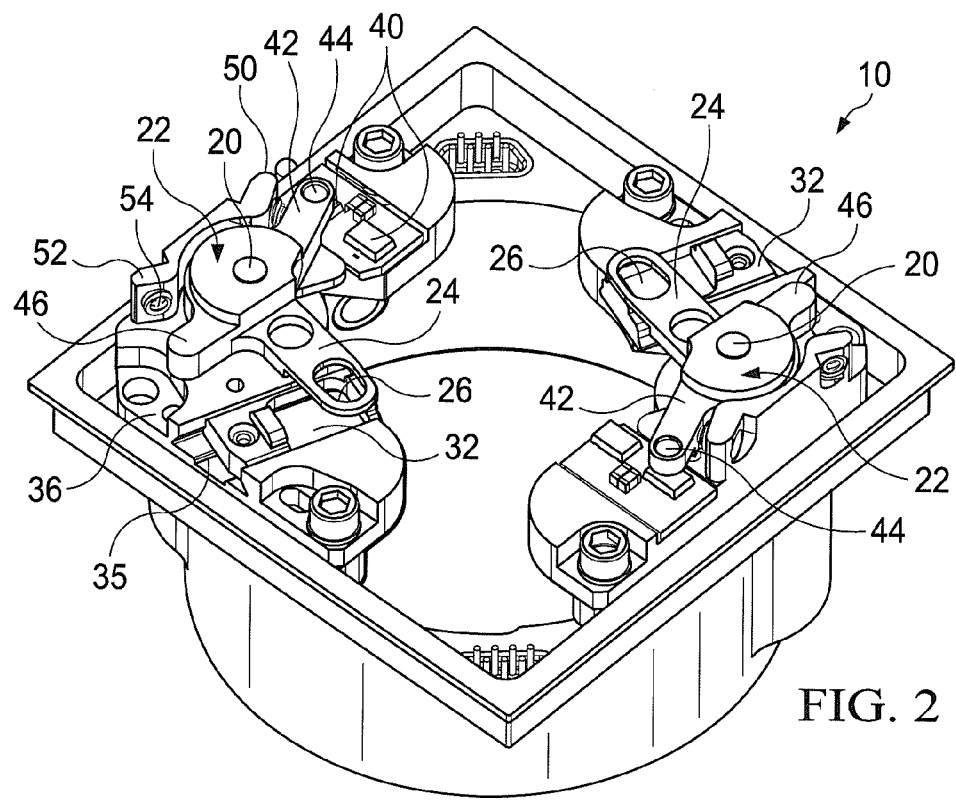
FIG. 2 illustrates the thermally isolated drive system of FIG. 1 with the shutter removed.
Figure 4:
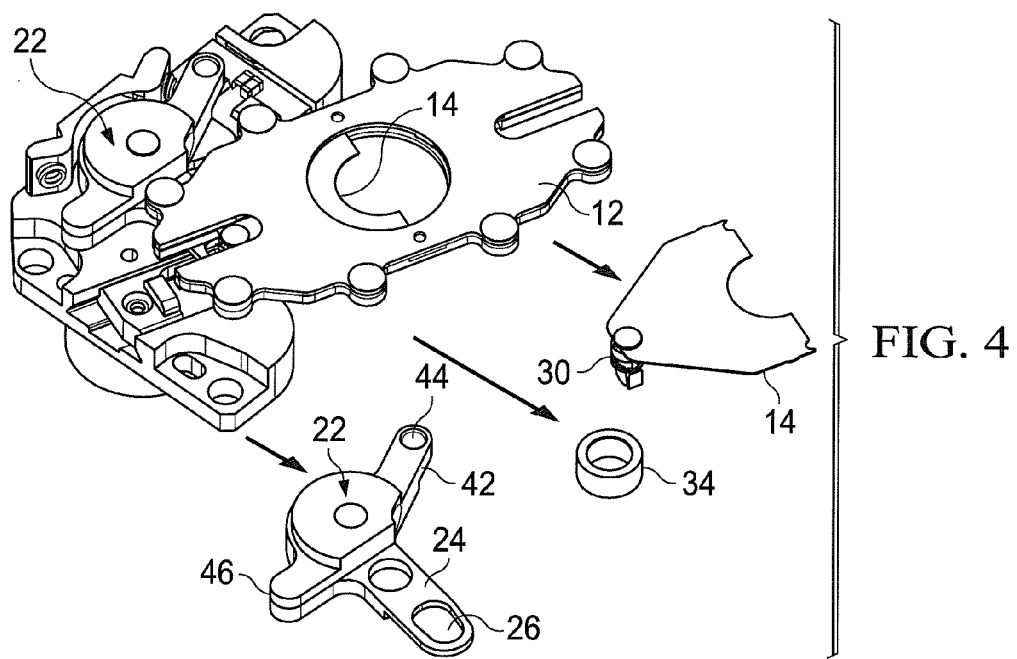
FIG. 4 illustrates an exploded view of part of the drive system illustrating the drive arm having an elongated recess configured as an opening to receive a drive pin and roller of the shutter slider member.
Figure 5:
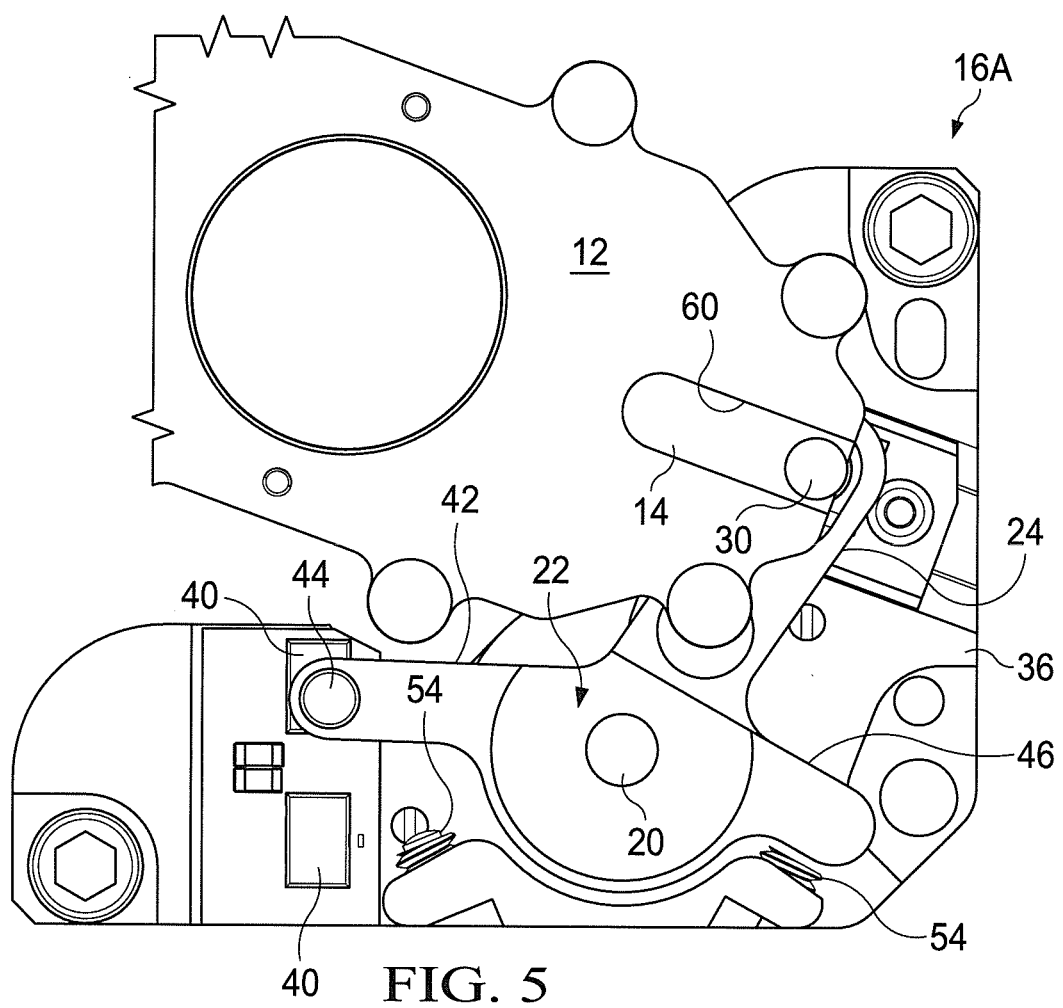
FIG. 5 illustrates the drive arm in a first "full open" position wherein the shutter slider member is in a corresponding first position.
Figure 6:
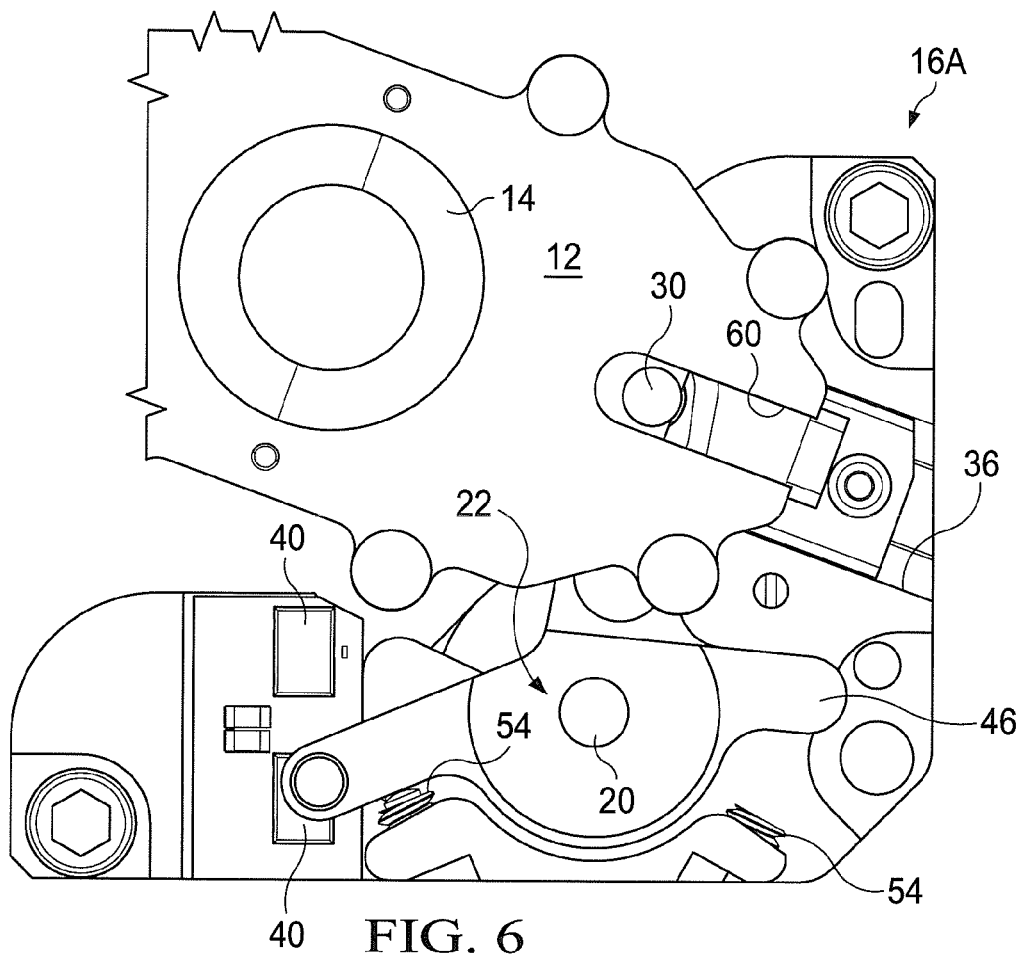
FIG. 6 illustrates the drive arm in a second "full closed" position wherein the shutter slider member is in a corresponding second position.

FIG. 1 illustrates a top perspective view of a IR thermal imaging shutter apparatus 10 including a shutter mechanism comprising a plate 12 and a sliding aperture blade 14 configured to be driven by a pair of drive mechanisms generally shown at 16A and 16B. Each drive mechanism 16A and 16B comprises a rotary motor 18 (see FIG. 3) having a rotatable actuator pin 20 coupled to and driving a balanced rotatable drive crank 22. Each drive crank 22 has a radially extending elongated arm 24 (see FIG. 2), configured to selectively rotate arm 24 between a first "full open" position and a second "full closed" position as shown in FIG. 5 and FIG. 6, as will be discussed shortly. Each arm 24 has a distal end having a recess 26, as shown in FIG. 2, the recess 26 preferably comprising an elongated opening in one preferred embodiment as shown. The recess 26 could also comprise a slot or other open ended structure if desired, and limitation to an opening is not to be inferred. Each arm recess 26 is configured to receive, but is spaced from, a respective actuatable member 30 and roller 34 (see FIG. 4) rotatably disposed thereabout. Each member 30 preferably comprises a shutter pin secured to one respective end of the aperture blade 14 as shown in FIG. 4. Each member 30 is also secured to, and extends downwards towards, a respective slidable magnetic detent latch 32, wherein each detent latch 32 is securingly and slidably received in a respective dovetail slot 35 (see FIG. 2) defined in a frame 36. Each detent latch 32 is preferably comprised of a dovetail plug configured to slide linearly inside the corresponding dovetail slot 35 in frame 36, along with respective shutter pin 30 and roller 34 when manually adjusted, and locked into position when positioned in the final desired location by a set screw 37 pressing the plug 37 upwards into the dovetail slot 35, providing an accessible locking feature while inducing minimal additional linear motion. Upon rotation of the arms 24, the respective openings 26 engage the respective roller 34 encompassing the respective shutter pin 30 to linearly move the aperture blade 14 between a first full open position and a second full closed position, wherein the roller 34 rotates in the opening 26 during transition, and is then spaced therefrom at the end of the transition.

FIG. 2 depicts the apparatus 10 with the shutter plate 12 and aperture blade 14 removed, illustrating the drive mechanisms 16A and 16B including the respective arms 24 having openings 26, the magnetic detent latches 32 without shutter pins 30, as well as a pair of proximity sensors 40 (see FIG. 3) to indicate the final position of the arm, preferably comprised of Hall effect sensors. Each drive crank 22 has a proximity indicating arm 42 including a magnet 44 disposed at a distal end therein and selectively extending over one of the proximity sensors 40 as a function of the arm 24 position. When the arm 24 is in the first full open position as shown in FIG. 5, the first proximity sensor 40 indicates the drive crank 22 is in place at the open position, and when the arm 24 is in the second full closed position as shown in FIG. 6, the second proximity sensor 40 indicates the drive crank 22 is in place at the closed position. Magnetic cogging, created internally to the actuator 18 and in the detent magnetic latch 32, forces the arms 42 and 46 against the set screws 54 in stops 50 and 52 and prevents any play at the end of travel.

Figure 3:
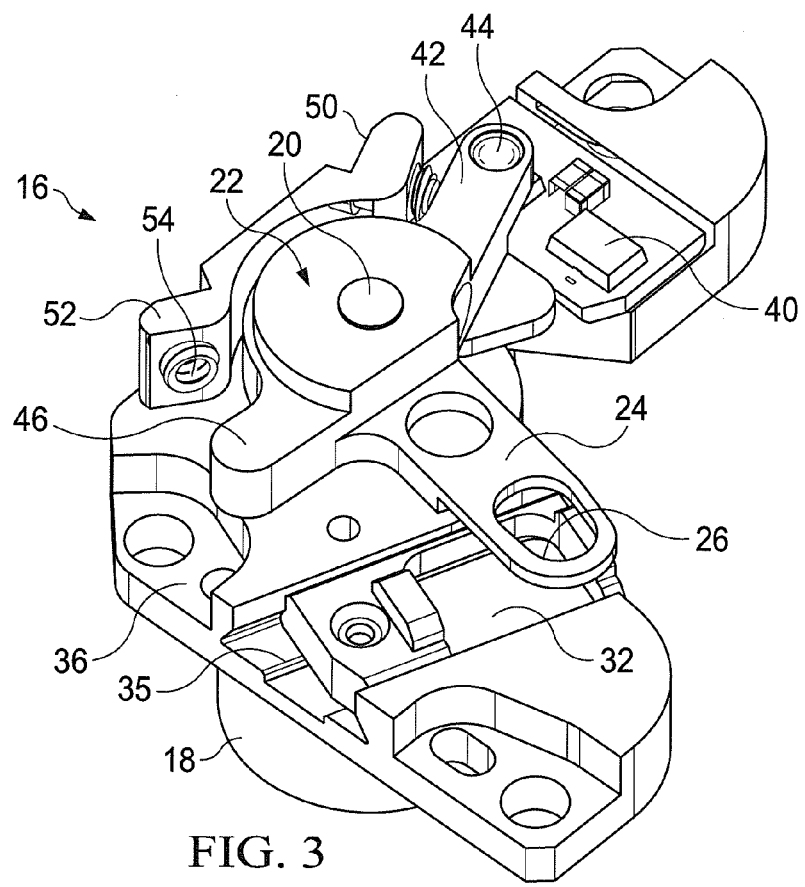
FIG. 3 illustrates a perspective view of one drive mechanism.

FIG. 3 depicts a perspective view of one drive mechanism 16 with arm 24 positioned between the first and second position, illustrating the travel path of the arm, which may be, for instance, 24 degrees, although limitation to this path is not to be inferred.

FIG. 4 depicts an exploded view of one drive mechanism 16 and one end of the shutter plate 14 configured to be positioned as a function of the drive mechanism positions. The shutter pin 30 consists of a cylindrical post which captures roller 34 to prevent sliding along the distal slot 26, and a magnet below provides detent pulling when in close proximity of the shutter pin 30, but not contacting, to the arms of the detent magnetic latch 32.

Figure 9:
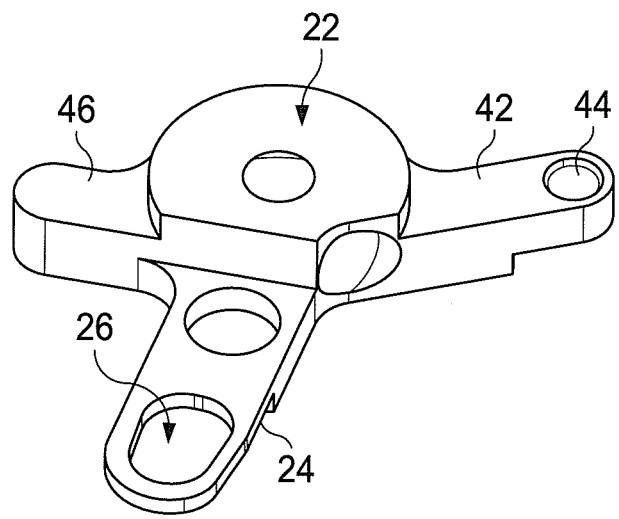
FIG. 9 illustrates a perspective view of the drive crank including the arms.

Each drive crank 22 further comprises a radially extending arm 46, wherein each of arms 42, and 46 are shorter than the elongated arm 24 as shown in FIGS. 5 and 6, as well as FIG. 9. Each of arms 24, 42, and 46 are balanced about the center of the drive crank 22, such that the center of gravity of drive crank 22 is balanced when coupled to the respective actuator pin 20. This makes system 10 far less sensitive to extremely high shock requirements. Each arm 42 and 46 has a travel stop limit comprising a stop member 50 and 52, respectively, of which each contains an adjustable travel limit set screw 54. Stop member limit screws 54 in turn establish the precise travel path and limit of arm 24, and thus the precise limit position of the driven shutter plate 14. Again, proximity sensors 40 indicate whether the drive crank 22, and thus the arm 24 and shutter plate 14, is in one of two positions.

When the shutter plate 14 is in the full open position, the arm 24 of drive mechanism 16A is in the full open position and the shutter pin 30 of drive mechanism 16A is positioned at a distal end of a slot 60 defined in one end of plate 12 as shown in FIG. 5. Correspondingly, the arm 24 of drive mechanism 16B is in the full open position, and the shutter pin 30 of the drive mechanism 16B is outwardly advanced in an opposing slot 60 defined at the opposing end of plate 12. The converse is true when the shutter plate 14 is in the closed position, as can be seen in FIG. 1 and FIG. 6.

Figure 7:
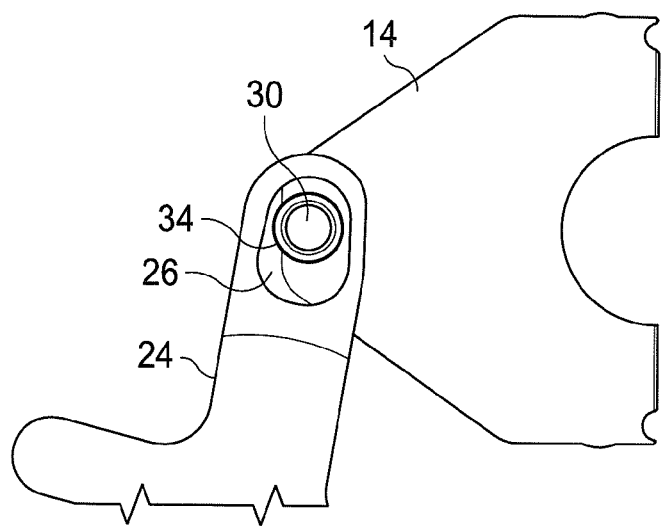
FIG. 7 illustrates a top view of the arm and elongated opening receiving, but physically and thermally separated from, the slider pin and roller in the first and second position.
Figure 8:
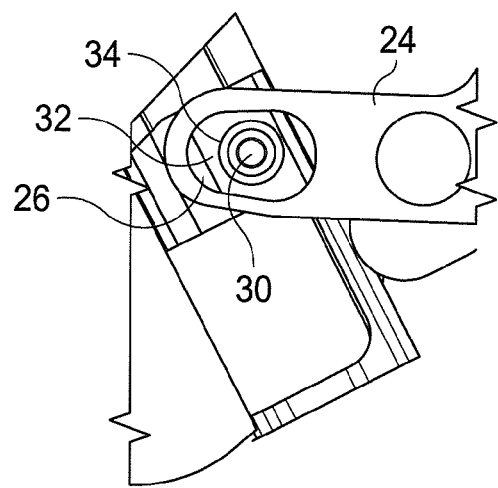
FIG. 8 illustrates a top view of the arm in the first position showing the asymmetric clearance of the arm from the slider pin and roller, including the radial play of the actuator compared to this clearance.

Advantageously, as illustrated in FIG. 7 and FIG. 8, each shutter pin 30 and the corresponding roller 34 remain physically and thermally separated from the respective arm 24 when in the first position and the second position due to a spacing created therebetween in both positions, thus creating a thermal barrier, also referred to as thermal isolation. The arm 24 only engages the rollers 34 disposed about the shutter pin 30 for a very short time period during movement/ actuation of the shutter plate 14 from one position to the other. Thus, the drive mechanisms 16A and 16B and all parts thereof are thermally isolated from the driven shutter plate 14 when in the operable full open or full closed position. The shutter mechanism including the plate 12 and shutter plate 14 are preferably configured in a vacuum having a true IR Dewer cryogenic environment.

Moreover, the spacing of the arms 24 from rollers 34 provides the motors 18, and thus the respective arms 24, time to accelerate from the respective first rest position or second rest position which advantageously builds momentum in the arms 24 before engaging and driving the respective rollers 34, converting the actuation mechanism from torque transfer to momentum transfer of energy. This additional momentum helps overcome the magnetic detent forces of the magnetic detent latch 32 acting against the shutter pin 30, holding arms 42 or 46 against the stop posts 50 or 52. The impact of the arm 24 engaging the roller 34 during rotation also helps overcome any stiction that may be present. This spacing increases the required force margin from 25% to 900%. The spacing also allows the use of a less precise solenoid motor 18, which has a relatively large amount of play and thus is less suitable for driving the arm 24 directly. Each arm opening 26 provides a loose fitting about the respective shutter pin 30 and roller 34, such that the motor loose play does not impair operation of the shutter aperture. Conversely, the loose tolerances of the arm openings 26 mitigate the risk of an inadvertent rebound. The aperture blades 14 have internal stops, which engage prior to the holding arms 42 or 46 contacting their respective stop. Since the shutter pin 30 is not firmly engaged within the distal slot 26, the aperture blade can rebound before the arm 42 or 46 contacts the stop set screw 54 and rebounds. Additional margin is provided by the fact that the arm has much higher inertia than the aperture blade, and rebounds correspondingly slower. The high level of damping in the actuator bearings in 18 diminishes the magnitude of the arm rebound. These features prevent a situation where the rebounding arm 24 impacts the shutter pin 30 and roller 34 while traveling in the opposite direction. Such impact could exert extremely high forces onto the shutter pin 30 due to the arm's much higher inertia.

As shown in FIG. 8, the clearance between the respective roller 34 and arm opening 26 is slightly asymmetric, although it may be symmetric if desired. In one preferred implementation, there is about 1.4 degrees of clearance, also referred to as a dead zone, equating to about a 0.011 inch clearance, although limitation to this angular spacing or clearance is not to be inferred. The arm travel limit set stops established by screws 54 are preferably set to detent to within ⅕ of the dead zone, about 0.28 degrees.

In one preferred embodiment, a rotary solenoid is used as motor 18 as it provides consistent reliability and an adjustable stroke, such as manufactured by Brandstrom Instruments of Ridgefield Conn. The fine adjustment features of the drive crank 22 using the travel limit screws 54 in the stationary motor mount stop limit members 50 and 52 help establish this stroke. This design is superior to a piezo drive motor that is inherently unreliable, although is functionally acceptable. Alternate rotary motors could comprise DC stepper motors, and limitation to the particular rotary motor is not to be inferred. This invention has advantages over motors and linkages that may allow motor over-travel which may overstress driven parts.

FIG. 9 illustrates a perspective view of the drive crank 22, including the four balanced arms.

Figure 10:
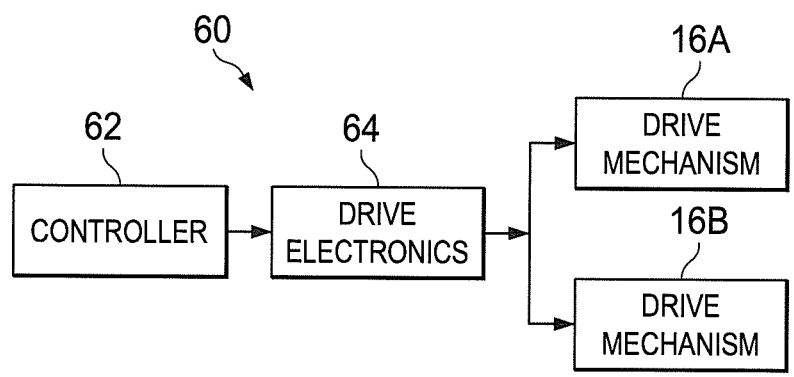
FIG. 10 illustrates a controller circuit configured to control the drive assembly.

FIG. 10 illustrates a control circuit at 60 that is configured to selectively drive each of motors 18, to control the positioning of the arms 24 and thus drive the shutter plate 14 between the first and second positions. The control circuit includes a controller 62 having a processor configured to control drive electronics 64 that interface with motors 18 of drive mechanisms 16A and 16B.

Figure 11:
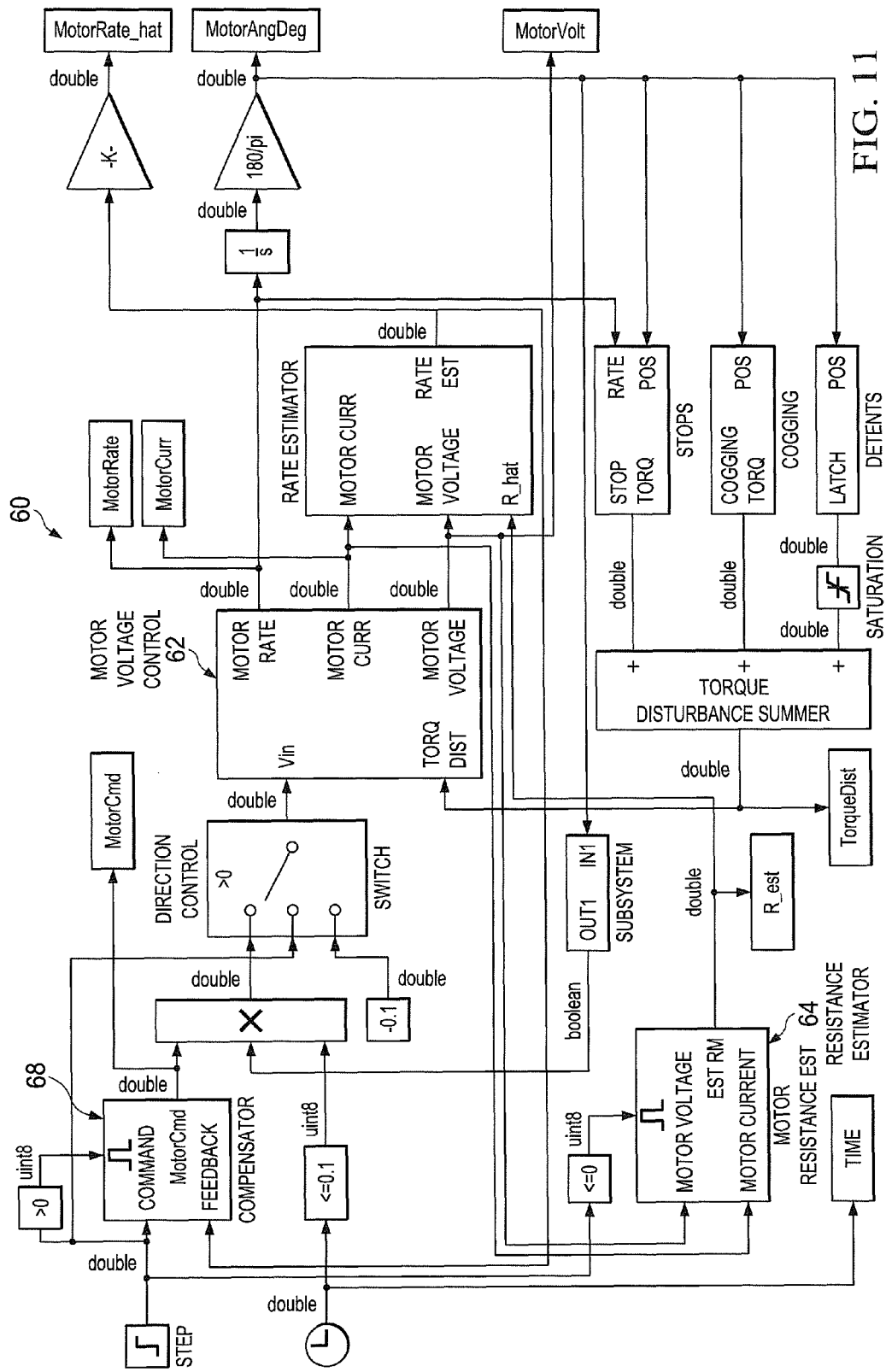
FIG. 11 illustrates a detailed electrical block diagram of the motor controller circuit having velocity control.

Referring now to FIG. 11, there is shown a detailed system diagram of the simulation 60 configured to simulate and control each bi-stable motor 18 of each drive mechanism 16A and 16B such that each bi-stable motor 18, and thus the respective drive crank 22, has a high starting torque, but a slower, regulated velocity as it moves through its range of travel. In turn, each locking arm responsively has a high drive force at the beginning of travel to release from the respective Hall Effect sensor 40 establishing the first detent position. In addition, each limit arm 46 has a lower kinetic energy at end of travel by limiting the terminal velocity and establishing a softer stop when engaging the respective stop limit 50 and 52. Rebounds are significantly reduced by lowering the kinetic energy at the end of the actuator travel path.

Each motor 18 acts as a tachometer, as motor rotation generates a back-emf proportional to motor rate. In a driven motor, back-emf is masked by the voltage drops across the motor coil impedance. However, the speed of the motor 18 can be computed from a knowledge of the back-emf constant Ke, motor coil resistance Rm, motor input voltage Vd, and motor current Im according to the following equation:

$$Wm = 1/Ke(Vd - ImRm)$$

The advantages of the back-emf control loop include no need for a transducer as the resistance of the motor coil is used. Further, there is no reduction in motor starting torque. This approach is more effective than energy dissipators. In one embodiment, the impact velocity of limit arm 46 is reduced from 143 rad/sec to 20 rad/sec, which significantly reduces the impact energy by 98%.

Controller 60 obtains the values of bi-stable motor 18 parameters by measurement immediately before driving the motors to advantageously maintain control of the motors in the unstable system. For instance, the resistance Rm and inductance Lm of the respective motor coils are measured. In one embodiment, each actuator motor 18 may drive arm 46 into limit stop 50 or 52 by a small calibration voltage Vd, such as a short 0.1V pulse of 5 or 10 ms, provided by motor control circuit 62. The coil resistance Rm may be calculated by resistance estimator circuit 64 correlating the sensed current Im associated with the calibration voltage Vd. Estimator 64 may be a field programmable gate array (FPGA). Inductance Lm may be measured similarly by control circuit 60 providing low level AC currents to the motors. Advantageously, the motor back-emf is sensed through the coil resistance, and an estimated motor rate circuit 66 determines the motor rate as a function of this back-emf, and sends a feedback signal indicative of the motor rate to a feedback loop junction 68 to maintain the desired motor rate.

The system, shown modeled in Matlab, provides the basis for operation of the back-emf. Upon initialization the system must first identify on which stop it is, achieved by observing the return from the two Hall effect proximity sensors. The system must also determine if the commanded move is in the appropriate direction. If the command to move is consistent with the arm position, then the system initiates the resistance measurement sequence. During this sequence, the arm is commanded to move in the opposite direction, directly into the stop, at a low voltage command level. The current is measured using a sense resistor or other means. Given that sense resistors exhibit far better resistance stability than the copper windings within the motor, the resistance of the motor can be deduced by determining the overall resistance of the system, then subtracting out the sense resistor. If desired, a look-up table can be employed to compensate for the sense resistor thermal changes. While theoretically the system could be operated using only a temperature sensor and a look-up table, the temperature in the motor can change during operation and subsequent moves at a nominal temperature could act against significantly different motor resistance.

Once the resistance is measured, it is sent to the rate estimator to set the gain and the command to move in the proper direction is issued. The motor command is sent into a compensator. In this embodiment, the compensator is described by the transfer function:

$$G_{comp}(s) = \frac{V_{cmd}}{\text{Error}}$$
$$= 1.034 \times 10^6 \frac{(s + 689)(s + 275)}{(s + 1.393 \times 10^5)(s + 166)(s + 0.1695)}$$

The compensated command is then sent to the plant model, described by the transfer function in this embodiment as:

$$G_{Plant}(s) = \frac{\omega}{V_{cmd}}$$
$$= 7.219 \times 10^{10} \frac{s}{(s + 1.028 \times 10^5)(s + 1809)(s + 725.7)(s - 507.2)}$$

The pole located in the positive domain (s−507.2) is a direct result of the inherent instability of the system. It is also noteworthy that does not attempt to cancel the unstable pole by the addition of an zero in the positive domain (unstable pole cancellation). The closed loop transfer function of the system is described by:

$$G_{cl}(s) = \frac{\text{Error}}{\text{Cmd}} = \frac{1}{1 + G_{comp}(s)G_{Plant}(s)}$$
$$G_{cl}(s) = \frac{(s + 1809)(s + 725.7)(s - 507.2)(s + 166)(s + 0.1659)}{(s + 616.6)(s + 405.2)(s - 0.048)(s^2 + 1140s + 1.561 \times 10^6)}$$

Since unstable pole cancellation was not attempted, one of the closed loop poles (s−0.048) remains unstable. However, the unstable pole is pulled close to the origin and the time constant of the pole is now approximately 21 seconds. Given that the move is completed in less than 100 milliseconds, the response of this pole is sufficiently slow that unstable behavior does not have adequate time to manifest itself before the move is complete. Other actuators and systems may require different compensation. An engineer skilled in the art can be expected to tailor the compensator for a given plant and actuator combination, such that the unstable poles are sufficiently slow so as not to manifest themselves in a deleterious manner. While compensated commands are sent to the motor, the motor rate is estimated by measuring the voltage picked off from a sense resistor. The motor command and the sensed rate is then fed through lead-lag and lag compensation to account for phase shifts generated by the motor inductance. Once a rate estimate is generated, it is fed back to adjust the motor command.

The simulation applied torque disturbances to the actuator arm. These disturbances represented the detent torque acting on the arm from the magnetic latches on the aperture, as well as internal cogging of the motor. These torques acted the most strongly on the arm at the extremes of travel. The disturbances captured the unstable behavior of the actuator. Other torque disturbances, such as friction, viscous damping, and air resistance could be included in other plant embodiment simulations.

In this embodiment, the command to move is terminated when the arm passes the Hall Effect proximity sensor nearest to the end of travel. Iterations of the simulation indicated that the settling time was reduced if the drive current was removed from the actuator prior to hitting the stop. In other embodiments, it may be preferable to apply power to the actuator up to or after initial contact with the stop.

Velocity control of solenoids is not common as they are unstable. Velocity control of bi-stable solenoids is also not common because systems utilizing these devices are inherently unstable, even with closed feedback loops. Accurate measurement of the motor coil resistance is crucial to maintain control, and should be accurate to within +3%/−1% for reliable and stable control of the motors. Errors in motor coil resistance greater than these levels can cause oscillations between stops, and/or settling at a stop position. Unsensed inductance changes of about 20% can be tolerated, and 10% is preferred. Advantageously, the calculation of these motor values is independent of temperature, which is important because the resistance of motor coils, such as copper windings, can vary greatly over operating temperatures. For instance, the resistance of copper over a MIL-SPEC temperature range can vary by over 25%.

Figure 12:
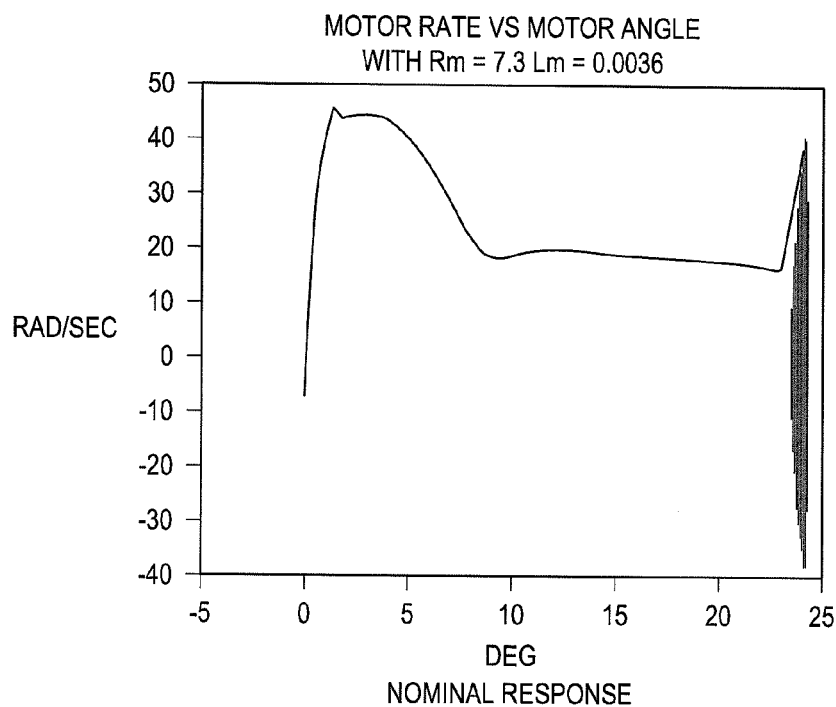
FIG. 12 illustrates a nominal response of the motor rate vs. motor angle.

FIG. 12 illustrates a nominal response of the motor rate vs. motor angle with Rm=7.3 and Lm=0.0036.

Figure 13:
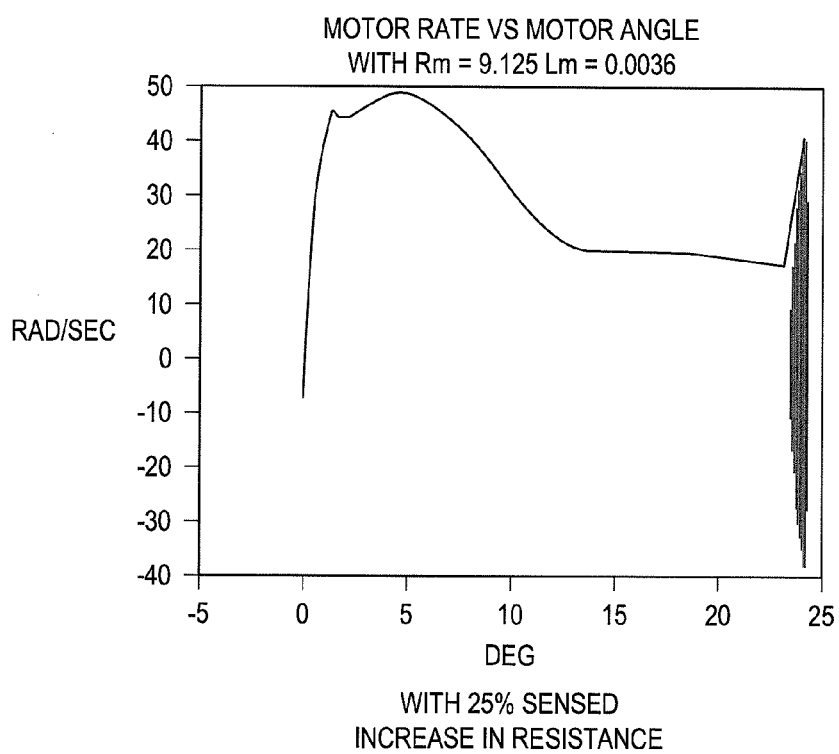
FIG. 13 illustrates a response with a 25% sensed increase in resistance.

FIG. 13 illustrates a response with a 25% sensed increase in resistance, where Rm=9.125 and Lm=0.0036.

Figure 14:
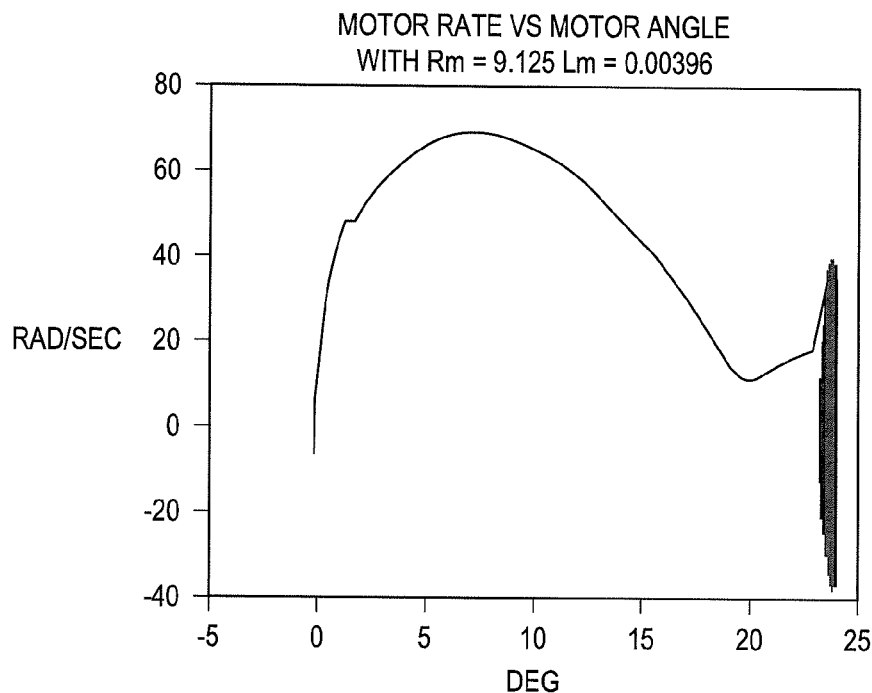
FIG. 14 illustrates a response with at 25% sensed increase in resistance and 10% unsensed increased in inductance.

FIG. 14 illustrates a response with at 25% sensed increase in resistance and 10% unsensed increased in inductance, where Rm=9.125 and Lm=0.00396.

Figure 15:
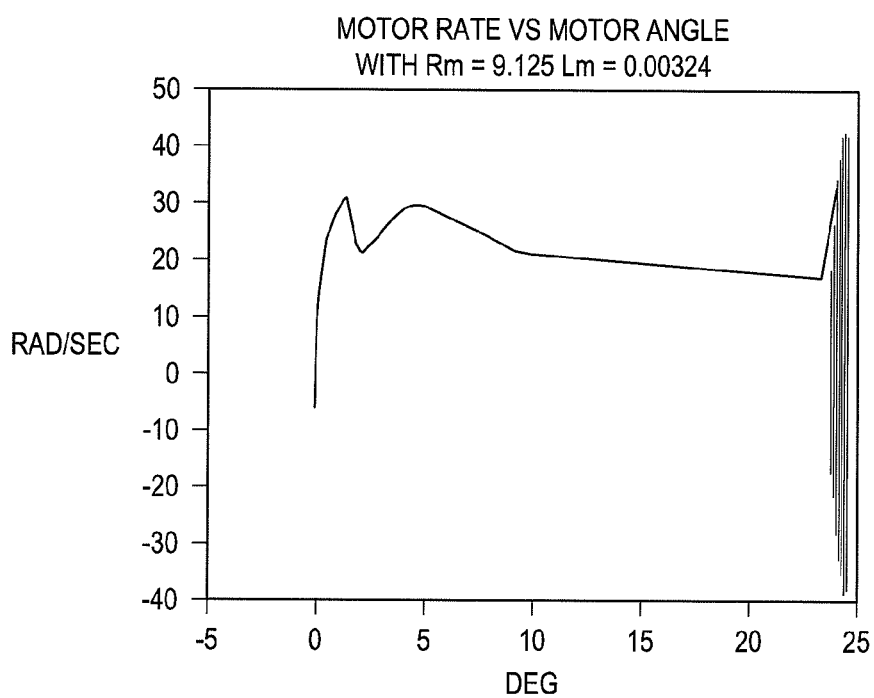
FIG. 15 illustrates a response with at 25% sensed increase in resistance and 10% unsensed decrease in inductance.

FIG. 15 illustrates a response with at 25% sensed increase in resistance and 10% unsensed decrease in inductance, where Rm=9.125 and Lm=0.00324.

Figure 16:
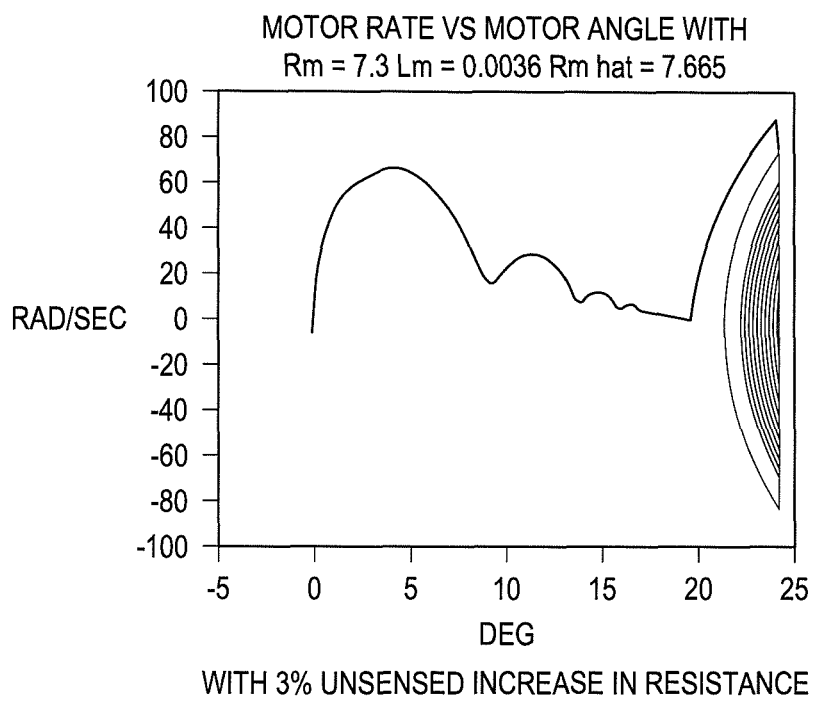
FIG. 16 illustrates a 5% unsensed increase in resistance showing an uncontrolled response.

FIG. 16 illustrates a 5% unsensed increase in resistance where Rm=7.3, Lm=0.0036 and Rm hat=7.665, showing an uncontrolled response.

Figure 17:
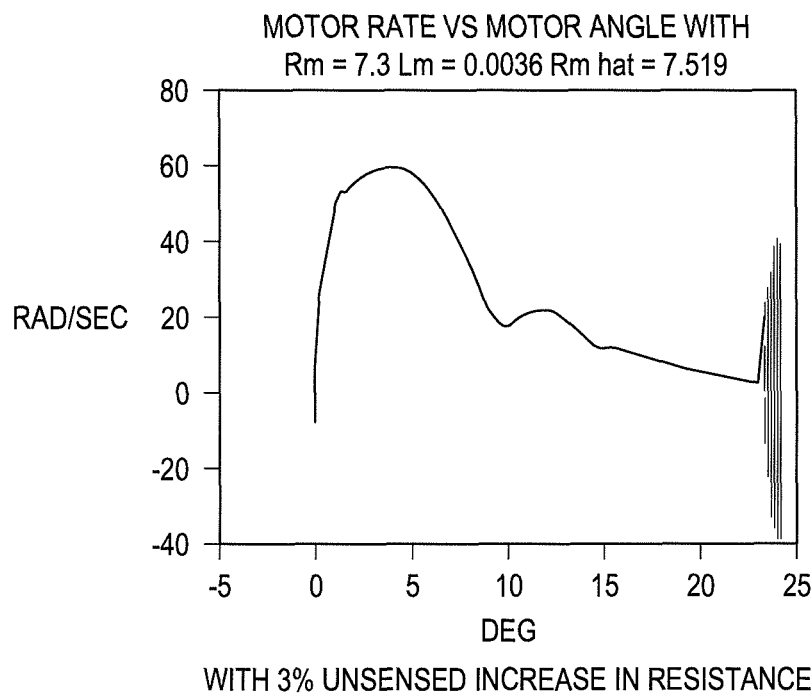
FIG. 17 illustrates a 3% unsensed increase.

FIG. 17 illustrates a 3% unsensed increase in resistance where Rm=7.3, Lm=0.0036 and Rm hat=7.519.

Figure 18:
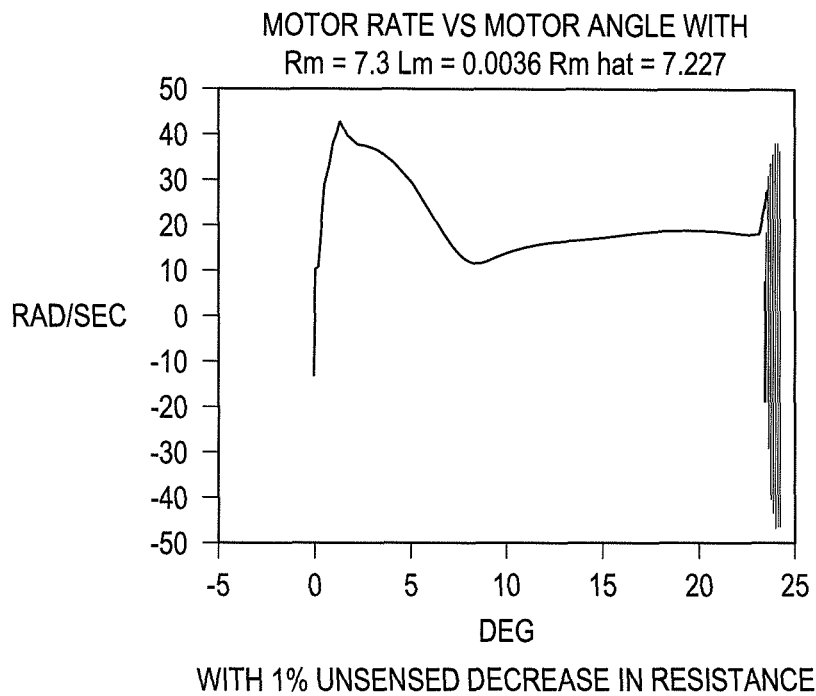
FIG. 18 illustrates a 1% unsensed decrease.

FIG. 18 illustrates a 1% unsensed decrease in resistance where Rm=7.3, Lm=0.0036 and Rm hat=7.227.

Figure 19:
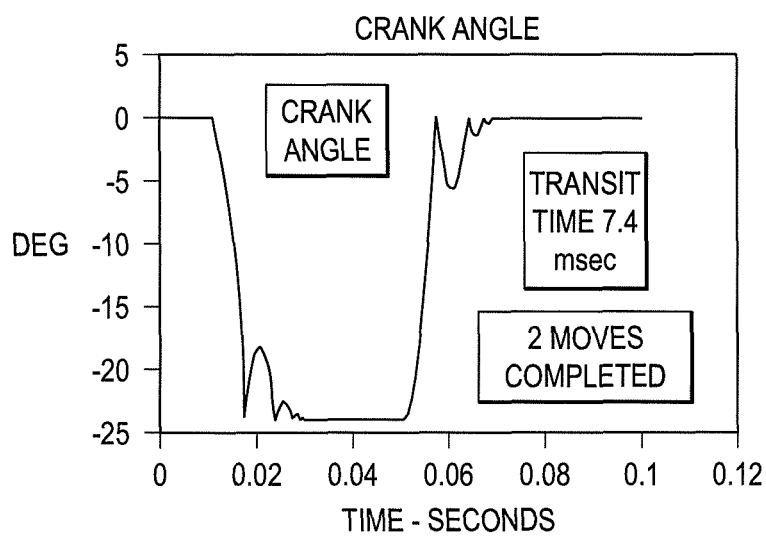
FIG. 19 illustrates a crank angle of the drive crank as a function to time, illustrating transit time between position 1 and position 2 in each direction.

FIG. 19 illustrates crank angle of drive crank 22 as a function to time, illustrating transit time between position 1 and position 2 in each direction.

Figure 20:
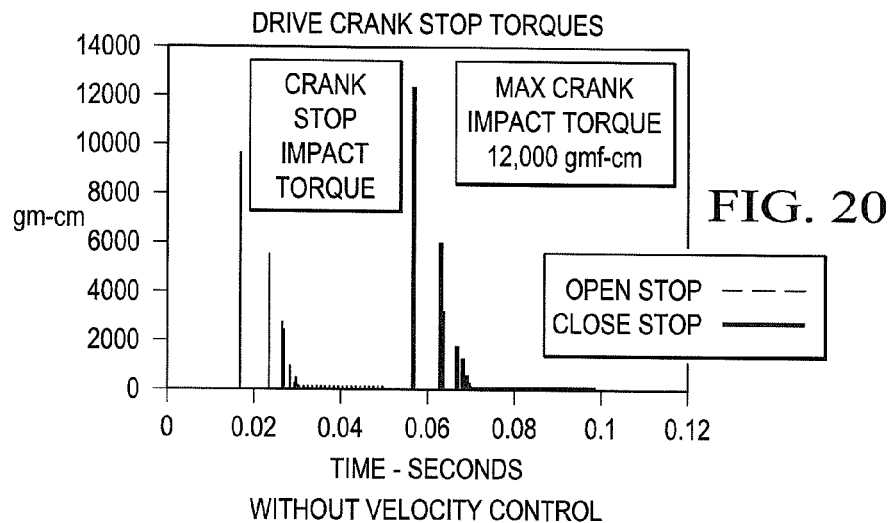
FIG. 20 illustrates crank stop impact torque without velocity control according to the invention.

FIG. 20 illustrates crank stop impact torque without velocity control according to the invention.

Figure 21:
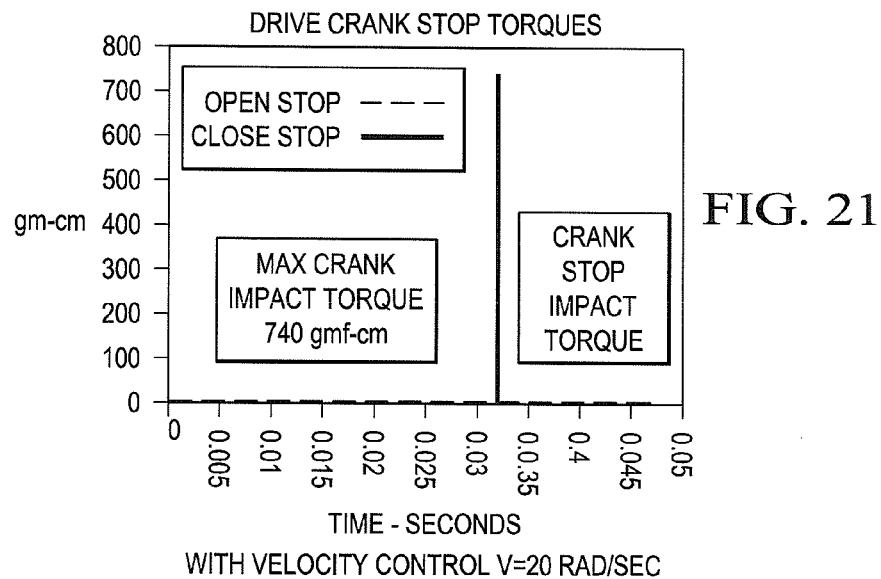
FIG. 21 illustrates crank stop impact torque with velocity control of according to the invention.

FIG. 21 illustrates crank stop impact torque with velocity control of V=20 rad/sec according to the invention.

Figure 22:
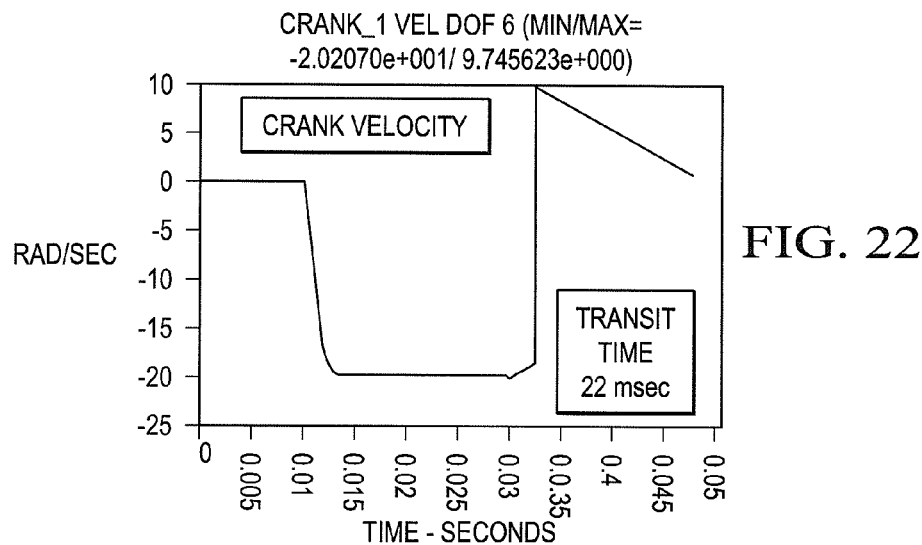
FIG. 22 illustrates the velocity of crank for each transition of the drive crank.

FIG. 22 illustrates the velocity of crank 22 for each transition of the cranks.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A device comprising:
a bi-stable rotary solenoid motor having a motor coil and a motor member, the bi-stable rotary solenoid motor configured to drive the motor member between a first position and a second position, each of the first and second positions associated with a stop structure that limits further movement of the motor member when the motor member contacts the stop structure; and
a controller configured to:
measure at least one of a resistance or an inductance of the motor coil before actuating the bi-stable rotary solenoid motor;
after the measurement, actuate the bi-stable rotary solenoid motor and control a velocity of the motor member as the motor member is driven between the first position and the second position;
control the bi-stable rotary solenoid motor to drive the motor member into the second position based on at least one computation using at least one transfer function and the at least one of the resistance or the inductance of the motor coil; and apply an alternating current (AC) signal to the bi-stable rotary solenoid motor to drive the motor member into the stop structure associated with one of the first and second positions to determine the inductance of the motor coil.

2. The device as specified in claim 1, wherein the controller is configured to control the bi-stable rotary solenoid motor without using a position sensor.

3. The device as specified in claim 1, wherein the controller is configured to measure the resistance of the motor coil and control the velocity of the motor member as a function of the measured resistance.

4. The device as specified in claim 3, wherein the controller is configured to measure a back electromotive force (EMF) of the bi-stable rotary solenoid motor to determine the resistance of the motor coil.

5. The device as specified in claim 4, wherein the controller is configured to apply a voltage to the bi-stable rotary solenoid motor to drive the bi-stable rotary solenoid motor into the stop structure associated with one of the first and second positions and determine the resistance of the motor coil as a function of the measured back EMF.

6. The device as specified in claim 5, wherein the controller is configured to measure a motor current in response to the applied voltage and determine the resistance of the motor coil as a function of the applied voltage and the measured motor current.

7. The device as specified in claim 3, wherein:
the controller comprises a motor rate estimator circuit configured to calculate a rotation rate of the motor member during the movement from the first position to the second position; and
the motor rate estimator circuit is configured to calculate the rotation rate of the motor member as a function of the measured resistance of the motor coil and a voltage and a current provided to the bi-stable rotary solenoid motor.

8. The device as specified in claim 1, wherein the controller is configured to measure the inductance of the motor coil and control the velocity of the motor member as a function of the measured inductance.

9. The device as specified in claim 1, wherein the controller has a feedback loop configured to control the velocity of the motor member as a function of at least one of the resistance or the inductance of the motor coil.

10. The device as specified in claim 1, wherein the controller is configured to actuate the bi-stable rotary solenoid motor and control a velocity of the motor member by actuating the motor with sufficient torque to overcome a magnetic detent force acting on the motor member and advance the motor member from the first position.

11. The device as specified in claim 1, further comprising:
a motor arm coupled to the motor member and configured to move with the motor member;
wherein the motor arm is separated from a roller when the motor member is in the first position or the second position; and
wherein the motor arm is configured to contact and drive movement of the roller while the motor member moves between the first position and the second position.

12. The device as specified in claim 1, wherein the controller comprises a motor rate estimator circuit configured to calculate a rotation rate of the motor member during the movement from the first position to the second position.

13. The device as specified in claim 1, further comprising:
an arm coupled to the motor member and configured to enable the bi-stable rotary solenoid motor to be driven into the stop structure associated with one of the first and second positions.

14. The device as specified in claim 1, further comprising:
a shutter responsively coupled to the motor member, the shutter configured to have a first shutter position when the motor member is in the first position and a second shutter position when the motor member is in the second position.

15. The device as specified in claim 14, wherein the shutter is thermally isolated from the motor member except when the motor member moves from the first position to the second position.

16. A device comprising:
a bi-stable rotary solenoid motor having a motor coil and a motor member, the bi-stable rotary solenoid motor configured to drive the motor member between a first position and a second position, each of the first and second positions associated with a stop structure that limits further movement of the motor member when the motor member contacts the stop structure;
a controller configured to:
measure at least one of a resistance or an inductance of the motor coil before actuating the bi-stable rotary solenoid motor;
after the measurement, actuate the bi-stable rotary solenoid motor and control a velocity of the motor member as the motor member is driven between the first position and the second position;
control the bi-stable rotary solenoid motor to drive the motor member into the second position based on at least one computation using at least one transfer function and the at least one of the resistance or the inductance of the motor coil; and
apply an alternating current (AC) signal to the bi-stable rotary solenoid motor to drive the motor member into the stop structure associated with one of the first and second positions to determine the inductance of the motor coil; and a shutter configured to have a first shutter position when the motor member is in the first position and a second shutter position when the motor member is in the second position.

17. The device as specified in claim 16, wherein the controller is configured to measure the resistance of the motor coil and control the velocity of the motor member as a function of the measured resistance.

18. The device as specified in claim 17, wherein the controller is configured to measure a back electromotive force (EMF) of the bi-stable rotary solenoid motor to determine the measured resistance of the motor coil.

19. The device as specified in claim 16, wherein the controller comprises a motor rate estimator circuit configured to calculate a rotation rate of the motor member during the movement from the first position to the second position.

20. The device as specified in claim 16, wherein the controller is configured to measure the inductance of the motor coil and control the velocity of the motor member as a function of the measured inductance.

* * * * *